United States Patent [19]
Poole

[11] Patent Number: 6,098,457
[45] Date of Patent: Aug. 8, 2000

[54] FLUID LEVEL DETECTOR USING THERMORESISTIVE SENSOR

[75] Inventor: David L. Poole, Portland, Ind.

[73] Assignee: CTS Corporation

[21] Appl. No.: 09/232,319

[22] Filed: Jan. 18, 1999

[51] Int. Cl.[7] ............................. G01F 23/24; G01F 23/22
[52] U.S. Cl. ........................................... 73/295; 73/290 R
[58] Field of Search ................................... 73/295, 290 R

[56] References Cited

U.S. PATENT DOCUMENTS

| | | | |
|---|---|---|---|
| 2,468,676 | 4/1949 | Liben | 177/311 |
| 3,111,031 | 11/1963 | Kuritza | 73/295 |
| 3,600,946 | 8/1971 | Ziemba . | |
| 4,567,762 | 2/1986 | Hoppert et al. | 73/304 R |
| 4,805,454 | 2/1989 | LeVert . | |
| 5,111,692 | 5/1992 | McQueen et al. | 73/295 |
| 5,197,329 | 3/1993 | Grundy | 73/295 |
| 5,210,769 | 5/1993 | Seidel et al. | 73/295 |
| 5,228,340 | 7/1993 | Kataoka et al. | 73/295 |
| 5,493,100 | 2/1996 | Renger | 219/497 |
| 5,685,194 | 11/1997 | McCulloch et al. . | |

*Primary Examiner*—Hezron Williams
*Assistant Examiner*—Willie Morris Worth
*Attorney, Agent, or Firm*—Mark P. Bourgeois; Alvin R. Wirthlin

[57] ABSTRACT

A fluid level detector according to the invention comprises a substrate formed of a heat-insulative material and one or more thermoresistive sensor elements located on the substrate that is adapted to be immersed in a fluid. A current source is connected to the sensor element for producing a current through the sensor element during a predetermined time period. The current heats the sensor element and causes a change in voltage across the sensor element at least during the time period. The amount of change in voltage during the time period is reflective of the fluid level, since the fluid serves as a heat sink for the sensor element. The voltage is measured across the sensor element and a voltage slope is determined. The determined voltage slope is indicative of fluid level.

16 Claims, 4 Drawing Sheets

FLUID LEVEL DETECTOR USING THERMORESISTIVE SENSOR

BACKGROUND OF THE INVENTION

1. Field of the Invention

This invention relates to liquid level detectors, and more particularly to an apparatus for sensing the level of a medium using a thermoresistive sensor.

2. Description of the Related Art

Prior art liquid level detectors, such as fuel detectors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. The wiper mechanism, when rotated, causes a change in electrical resistance that can be displayed at a convenient location in the passenger compartment of the vehicle in order to indicate fuel level within the tank. Liquid level gauges of this type are subject to wear due to the number of interconnected moving parts. Worn parts may result in complete mechanical breakdown of the gauge or, at the very least, inaccurate liquid level detection.

Prior art attempts to overcome the inherent deficiencies in float-type gauges have included sensor elements of the thermoresistive or thermistor type, wherein the thermal characteristics of fluids are used to monitor the level of liquid in a tank. These gauges generally include electrically heated thermistors located within the tank. The temperature of the thermistors and, consequently, their electrical resistance, increase as the liquid in which the thermistors are immersed, decreases. This change in resistance is used to determine the level of liquid in the tank. Generally, one thermoresistive element is used for measurement while a second thermoresistive element is used to compensate for errors which can occur as a result of temperature changes of the liquid itself.

U.S. Pat. No. 5,685,194 to McCulloch et al., the disclosure of which is hereby incorporated by reference, discloses a liquid level gauge having first and second thermoresistive sensors. Separate constant current sources supply power to each sensor. One of the current sources supplies sufficient current to the first sensor to cause self-heating of the first sensor, while the other of the current sources supplies relatively little current to the second sensor. Level or flow is determined by dividing the difference in voltages across the first and second sensors by the voltage across the second sensor. Other resistance-type liquid level sensors are disclosed in U.S. Pat. No. 3,600,946 and U.S. Pat. No. 4,805,454, the disclosures of which are hereby incorporated by reference.

SUMMARY OF THE INVENTION

A fluid level detector according to the invention comprises a substrate formed of a heat-insulative material; a sensor having a thermoresistive sensor element located on the substrate; a current source connected to the sensor element for producing a current through the sensor element for a predetermined time period; and means for measuring the voltage across the sensor element and for determining a voltage slope. The current passing through the sensor element serves to heat the sensor element and causes a change in voltage across the sensor element at least during the time period. The determined voltage slope is indicative of fluid level. In one embodiment, the sensor includes a U-shaped sensor element. In another embodiment, the sensor includes a plurality of sensor elements aligned in columnar fashion.

According to a further embodiment of the invention, a method of determining fluid level in a container comprises the steps of providing a substrate formed of a heat-insulative material; locating a thermoresistive sensor element on the substrate; heating the sensor element for a predetermined time period; measuring a change in the sensor element at least during the time period; determining a slope based on the measured change in the sensor element; and indicating fluid level based on the determined slope.

Preferably, the step of heating the sensor element comprises applying a constant current through the sensor element for the predetermined time period, while the step of measuring a change in the sensor element comprises measuring voltages across the sensor element.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims be regarded as including such equivalent constructions since they do not depart from the spirit and scope of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will now be described with additional specificity and detail through the accompanying drawings.

DETAILED DESCRIPTION OF THE PREFERRED EMBODIMENTS

Figure 1:
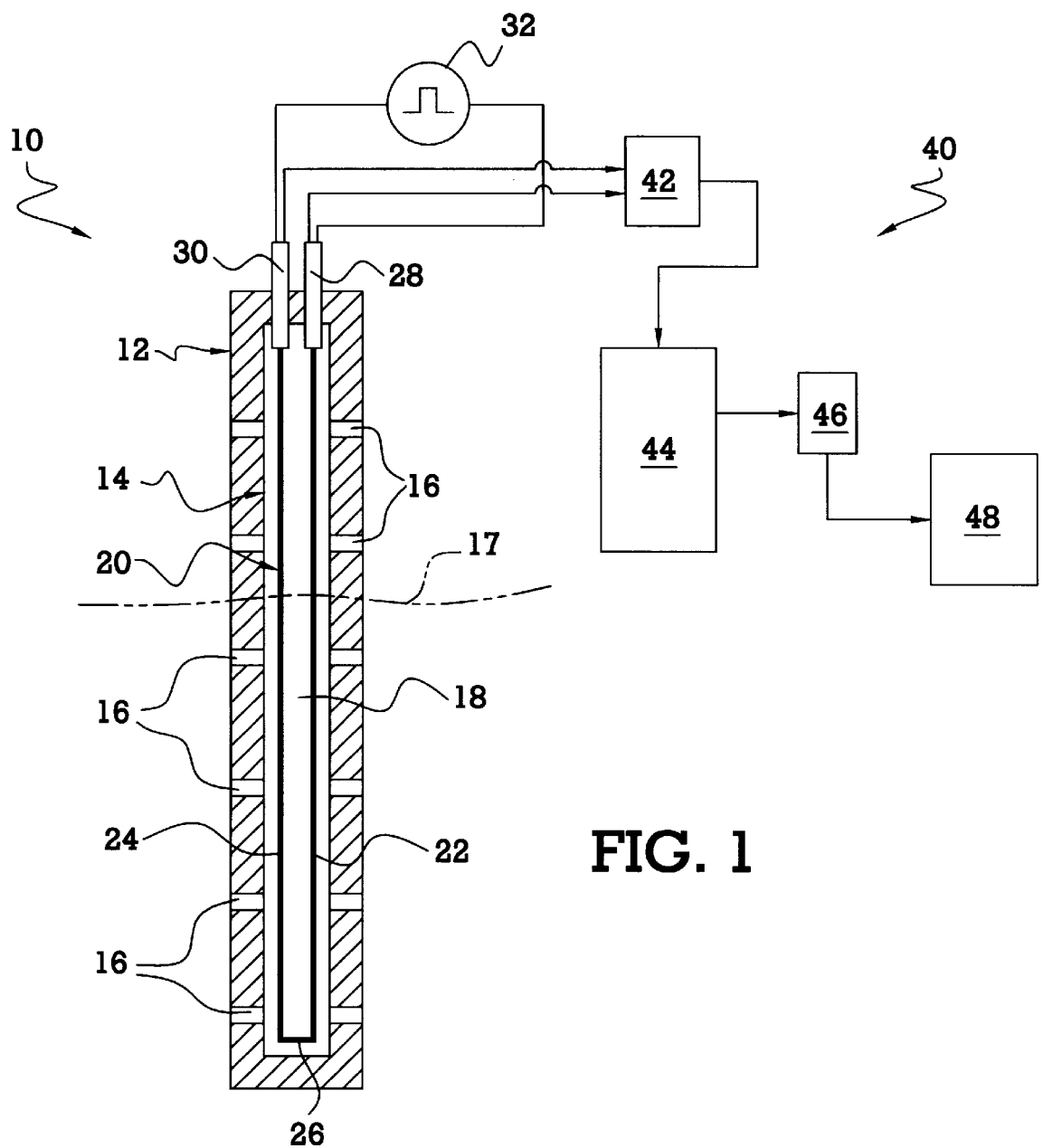
FIG. 1 is a schematic representation of a fluid level detector according to a first embodiment of the invention.

Referring now to the drawings, and to FIG. 1 in particular, a fluid level detector 10 according to the invention comprises a detector housing 12 within which a thermoresistive sensor 14 is contained. The housing 12 is adapted for installation into a liquid holding tank or container. The housing 12 is preferably tubular in shape and includes a plurality of openings 16 that extend through the housing for providing fluid communication between the interior and exterior of the housing such that the fuel level within the housing is substantially the same as the fuel level 17 outside the housing. The cross-sectional shape of the tubular housing can be circular, square, rectangular, etc.

The sensor 14 includes a substrate 18 and a thermoresistive sensor element 20 located on the substrate. The substrate 18 is preferably constructed of a stiff material that has a relatively low thermal conductivity, such as a flame-retardant epoxy-woven glass board, commonly used for circuit boards and designated as "FR4" material under the American NEMA specification. In another possible arrangement, a Kapton™ film or other suitable polyimide film is adhered to a stiff rubber backing material or the like to form a laminated substrate 18. It is to be noted that other materials can be used, so long as they provide as little heat sinking as possible when the sensor element 20 is heated, as will be described in greater detail below.

The thermoresistive sensor element 20 is preferably screen printed onto the substrate 18 and is constructed of a polymer resistor or thermistor material having a high thermal coefficient of resistance (TCR), i.e. a material that exhibits a high resistivity change in response to temperature change. Preferably, the resistivity change is linear and repeatable over a wide operating temperature range. Element 20 also preferably exhibits relatively low thermal mass, a relatively high thermal conductivity, and a low initial resistance in the absence of an applied electrical current. The sensor element 20 is shown in FIG. 1 as being U-shaped in configuration with a first leg 22 connected to a second leg 24 by a lower bight portion 26. A terminal 28 is electrically connected to an upper end of the leg 22 while a terminal 30 is electrically connected to an upper end of the leg 24. When the housing 12 is electrically conductive, at least one of the terminals should be electrically insulated from the housing. A current source 32 is connected to the terminals 28 and 30 for selectively heating the sensor element 20, as will be described in greater detail below.

Circuitry 40 for measuring voltage across the sensor element 20 and for processing the measured voltage includes a signal conditioning filter 42, a microcontroller 44, a display driver 46, and a display 48. The signal conditioning filter 42 is connected to the terminals 28 and 30, and can include a capacitor, amplifier, or combination thereof, or other conditioning circuitry. However, depending on the amount of supplied current, the resistivity of the sensor element 20, the temperatures to which the detector 10 may be exposed, and other factors, an amplifier and/or conditioning circuitry may not be needed. As shown, the conditioned voltage signals are then fed from the filter 42 into the microcontroller 44 for receiving and processing the conditioned signal. The display driver 46 and display 48 are in turn connected to the microcontroller 44 for displaying the liquid level.

Figure 2:
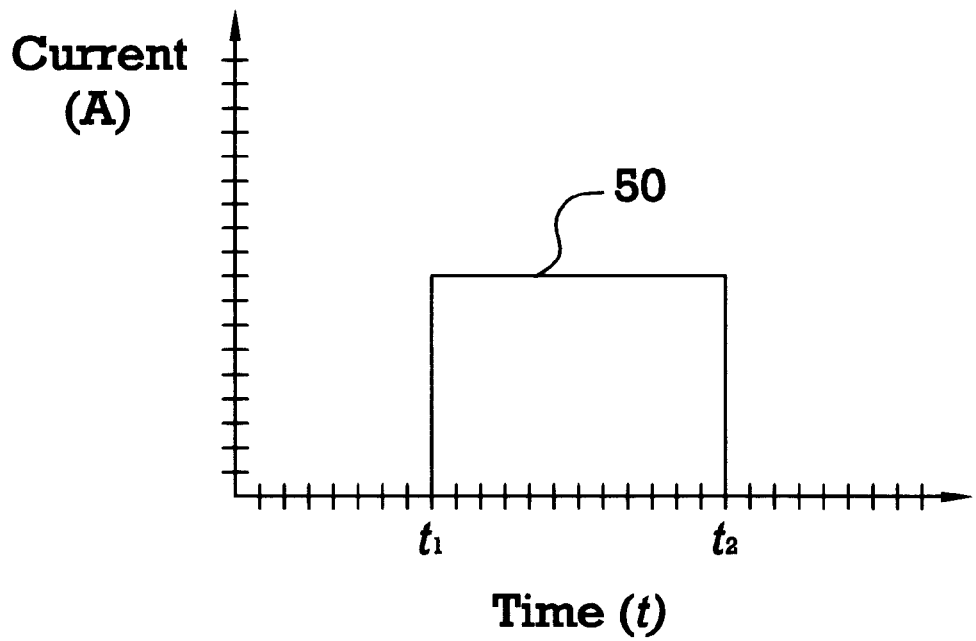
FIG. 2 shows a graph of an electrical current that is applied to a sensor element of the detector for a predetermined time period according to the invention.
Figure 3:
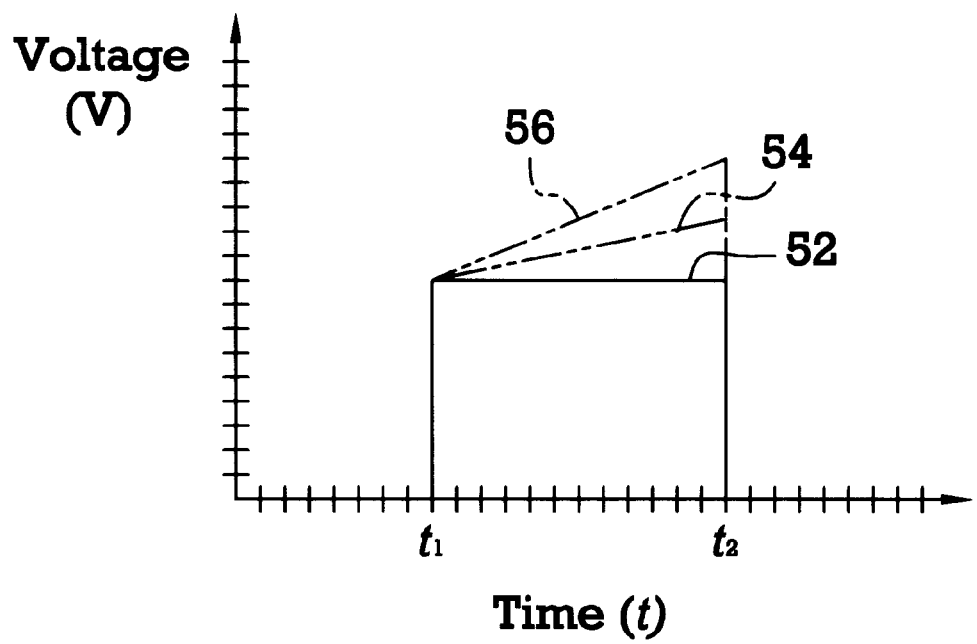
FIG. 3 shows different voltage slopes measured across the sensor element at various fluid levels.

With additional reference to FIG.'s 2 and 3, a constant electrical current 50 is supplied to the sensor element 20 through the terminals 28 and 30 for a predetermined time interval between time $t_1$ and $t_2$ as shown in FIG. 2, in order to raise the temperature of the sensor element 20. Since the substrate 18 is constructed of a material that has a relatively low thermal conductivity, the sensor element 20 will be heated to a relatively uniform temperature when fully immersed in the liquid and in the presence of the applied constant electrical current. With very little, if any, heat sinking occurring in the substrate, a voltage 52 measured across the sensor element 20 during the time interval will be substantially constant, as shown in FIG. 3, to thereby indicate a full tank. The liquid in contact with the sensor element 20 serves as a heat sink to conduct heat away from the sensor element. As the level of liquid in the tank decreases, only a portion of the sensor element 20 will be immersed in the fluid and therefore subject to heat sinking. Accordingly, the temperature of the sensor element will rise, which in turn will cause a corresponding increase in the resistivity of the sensor element and an increase in voltage over the predetermined time period, as represented by the sloped phantom line 54 in FIG. 3. A lower level of liquid in the tank will result in a steeper voltage slope, as represented by the sloped phantom line 56. Preferably, the microcontroller receives a plurality of signals from the sensor element 20 during the predetermined time interval and then calculates the voltage slope. It is to be understood however, that the voltage slope can be calculated with as little as two voltage measurements during the time period. The voltage slope can then be compared in the microcontroller with stored values in order to determine and display the liquid level in the tank. Although FIG. 4 shows voltages with positive slopes, which is reflective of a sensor element with a positive temperature coefficient, the sensor element may alternatively be constructed of a material with a negative temperature coefficient, thereby resulting in a negative voltage slope.

Figure 4:
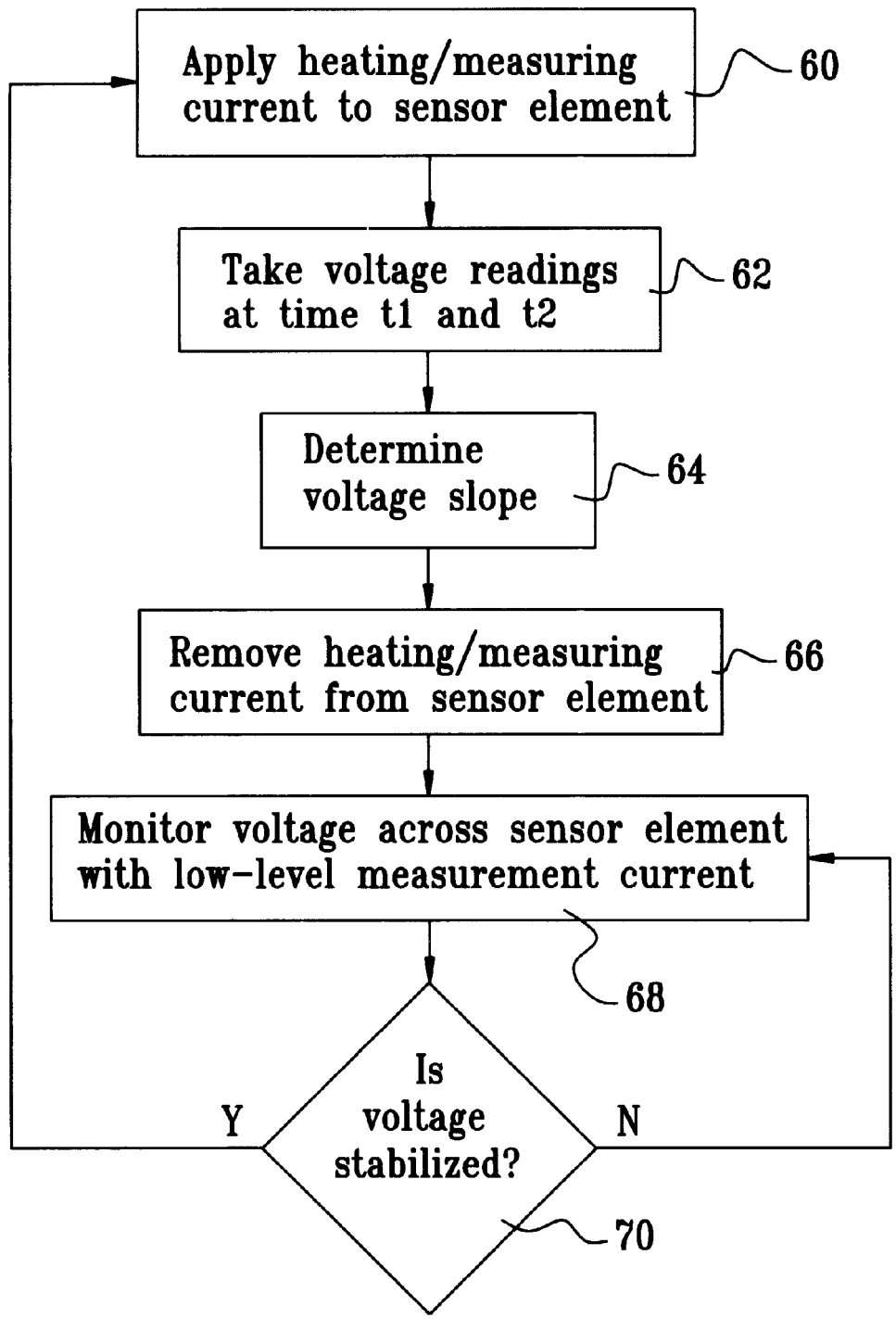
FIG. 4 is a block diagram illustrating a method of operating the fluid level detector according to the invention.

Turning now to FIG. 4, a method of measuring level within a container using the liquid level detector 10 according to the present invention is illustrated. In block 60, a constant current is applied through the sensor element 20 for a predetermined time period as described above. Voltage readings are then taken across the sensor element 20, as represented by block 62. A voltage slope is then determined in block 64 from at least two of the voltage readings. After the voltage slope is determined, the constant current is removed from the sensor element 20, as shown in block 66. In block 68, voltage across the sensor element 20 continues to be monitored by applying a relatively low level of current until the voltage stabilizes to a predetermined minimal level, as represented by block 70. Once it has been determined that the voltage is stable, the process is repeated by applying a constant current to the sensor element 20 to again heat the sensor element. A unique advantage of this arrangement is that ambient temperature variation is automatically eliminated since the voltage slope, which is directly related to the temperature slope of the sensor element 20, is independent of ambient temperature. Any increase or decrease in ambient temperature serves only to raise or lower the slope line, respectively, along the voltage axis, but does not change the value of the slope for a given liquid level.

In an alternate embodiment, the step of applying a relatively low level of current and monitoring the voltage level can be eliminated. In this instance, the sensor element 20 is heated and a voltage across the sensor element is taken at the beginning and end of a first predetermined period of time in order to determine a voltage slope. Once the voltage has been measured, which is indicative of liquid level, the constant current is removed for a second predetermined period of time before it is reapplied to the sensor element for taking another liquid level reading. By way of example, the first and second time periods may range from fractions of a second to twenty seconds or more, depending on the particular material used for the sensor element, the type of liquid being measured, the substrate material, ambient temperature, etc.

Figure 5:
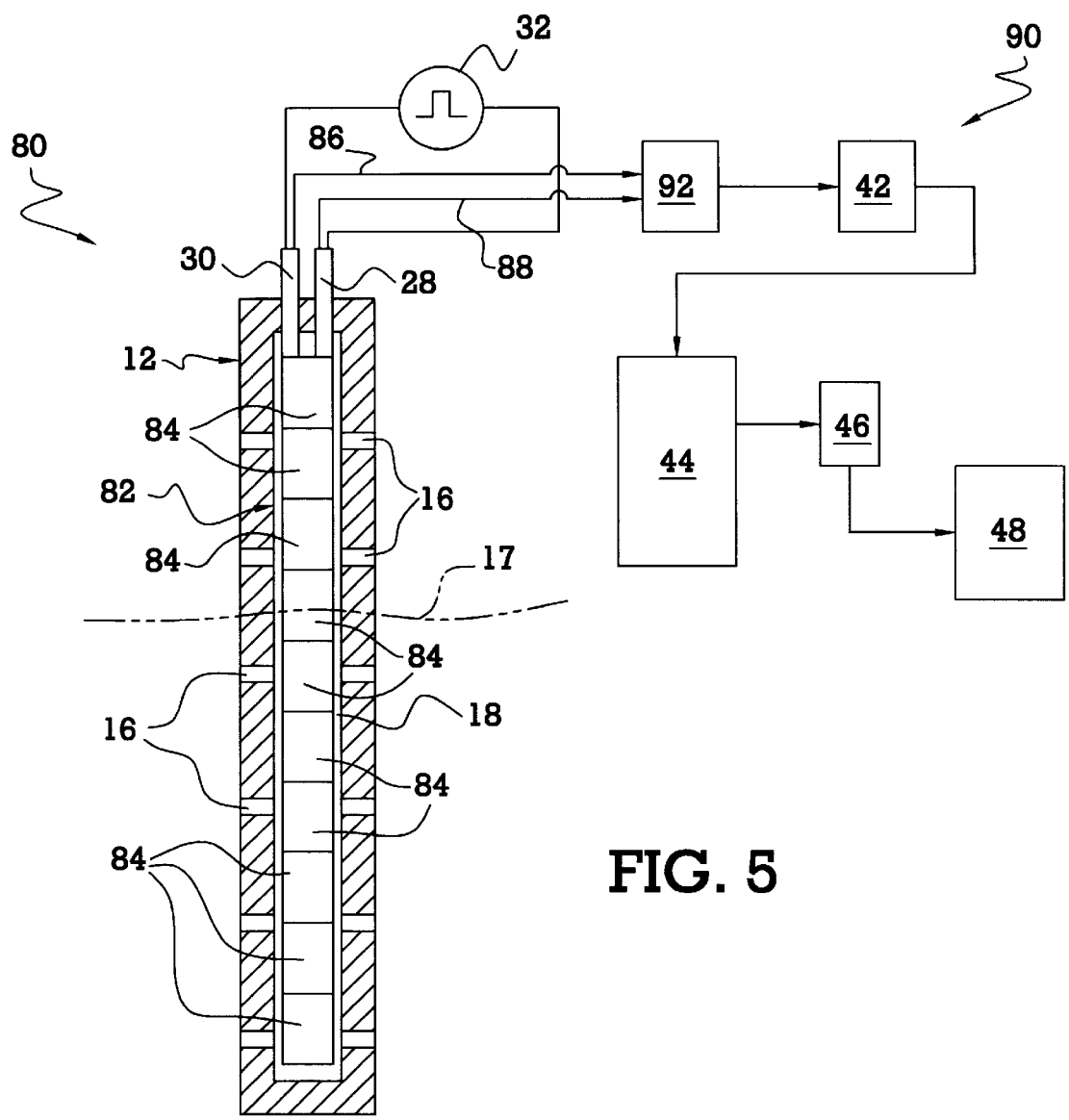
FIG. 5 is a schematic representation of a fluid level detector according to a second embodiment of the invention.

With reference now to FIG. 5, a fluid level detector 80 according to a second embodiment of the invention is illustrated, wherein like parts in the previous embodiment are represented by like numerals. The fluid level detector 80 is similar in construction to the fluid level detector 10, with the exception that a thermoresistive sensor 82 replaces the sensor 14. The sensor 82 includes a column of separate thermoresistive sensor elements 84 mounted on the substrate 18. Preferably, the thermoresistive sensor elements 84 are surface-mount devices that are attached to the substrate 18 using common surface-mounting techniques. Each sensor element 84 has a pair of leads (not shown) that are attached to the current source 32 and a multiplexer 92 that forms part of processing circuitry 90. The multiplexer 92 is adapted to receive separate voltage signals from each sensor element 84 through a multi-conductor cable 86 and a single conductor cable 88, and then send each signal to the filter 42 for further processing. As in the previous embodiment, a constant current is supplied through each of the sensor elements 84 to heat the elements and thereby change the voltage across the elements. The voltage across each element can then be measured during the predetermined time period and one or more voltage slopes can be determined, as previously described. Alternatively, the sensor elements 84 can be connected together in a series or parallel configuration with an analog voltage output, e.g., the voltage may be measured across the plurality of sensor elements instead of each sensor element.

Although the foregoing description is directed toward liquid level detectors, it is to be understood that the invention is not limited thereto. The above-described embodiments can also be used in applications to sense the flow of a medium or the like.

Moreover, although particular circuitry has been shown for measuring voltage and determining the voltage slope, it is to be understood that the microprocessor can be replaced and/or supplemented with analog circuitry in order to measure voltage and/or determine the voltage slope. Thus, the term "means" as used in the appended claims to represent circuitry is intended to refer to all circuitry capable of measuring and/or determining voltages and/or voltage slopes, whether by purely analog, digital, or combinations of analog/digital circuits.

While the invention has been taught with specific reference to the above-described embodiments, someone skilled in the art will recognize that changes can be made in form and detail without departing from the spirit and the scope of the invention. The describe embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A fluid level detector for being immersed in a fluid and thereby determining the fluid level, comprising:
    a) a substrate formed of a heat-insulative material;
    b) at least one thermoresistive sensor element located on the substrate to form a, having a resistivity that changes substantially linearly in response to temperature change;
    c) a current source, connected to the sensor element, for producing a current Through the sensor element for a predetermined time period to thereby heat the sensor element during the predetermined time period, the current source producing a voltage across the sensor element at least during the predetermined time period;
    d) means for measuring the voltage across the sensor element during the predetermined time period and for determining a voltage slope that varies relative to the amount of the sensor element that is immersed in the fluid;
    and means for monitoring the voltage across the sensor element subsequent to the predetermined time period for determining a stable condition of the sensor element.

2. A fluid level detector according to claim 1, wherein the thermoresistive sensor element has a positive temperature coefficient.

3. A fluid level detector according to claim 1, wherein the thermoresistive sensor element has a negative temperature coefficient.

4. A fluid level detector according to claim 1, wherein the substrate is formed of an epoxy-woven glass material.

5. A fluid level detector according to claim 1, wherein the substrate is formed of a laminate comprising a rubber base material and a polyimide sheet.

6. A fluid level detector according to claim 1, wherein the thermoresistive sensor element is U-shaped.

7. A fluid level detector according to claim 1, wherein the at least one thermoresistive sensor element comprises a plurality of thermoresistive sensor elements located on the substrate.

8. A fluid level detector according to claim 7 wherein the thermoresistive sensor elements are connected together in series.

9. A fluid level detector according to claim 7 wherein the thermoresistive sensor elements are connected together in parallel.

10. A fluid level detector according to claim 7, wherein the substrate is formed of an epoxy-woven glass material.

11. A fluid level detector according to claim 7, wherein the thermoresistive sensor elements are aligned in a column on the substrate.

12. A method of determining fluid level in a container, comprising:
    a) providing a substrate formed of a heat-insulative material;
    b) locating a thermoresistive sensor element on the substrate;

c) heating the sensor element for a predetermined time period by applying a relatively high electric current to the sensor element;

d) measuring a change in voltage of the sensor element during the time period;

e) determining a voltage slope based on the measured change in the sensor element;

f) indicating fluid level based on the determined slope;

g) monitoring the voltage of the sensor element after the predetermined time period by applying a relatively low electric current to the sensor element to thereby detect a stable condition of the sensor element; and h) repeating steps c) to f) once the stable condition has been detected.

13. A method of determining fluid level according to claim 12, wherein the step of heating the sensor element comprises applying a constant electric current through the sensor element for the predetermined time period.

14. A method of determining fluid level according to claim 12, wherein the step of locating a thermoresistive sensor element comprises screen printing a resistor material on the substrate, the resistor material having a resistivity that changes substantially linearly in response to temperature change.

15. A fluid level detector according to claim 7, wherein each of the thermoresistive sensor elements is a surface mount device attached to the substrate.

16. A fluid level detector according to claim 1, wherein the current source includes means for applying a relatively high current to the sensor element during the predetermined time period and a relatively low current to the sensor element subsequent to the predetermined time period.

* * * * *

UNITED STATES PATENT AND TRADEMARK OFFICE
CERTIFICATE OF CORRECTION

PATENT NO.: 6,098,457

DATED: August 8, 2000

INVENTOR(S): David L. Poole

It is certified that error appears in the above-identified patent and that said Letters Patent are hereby corrected as shown below:

Column 6, line 12, after "form a" insert -- resistor --.

Column 6, line 16, change "Through" to -- through --.

Signed and Sealed this

Twenty-fourth Day of April, 2001

*Attest:*

NICHOLAS P. GODICI

*Attesting Officer*     *Acting Director of the United States Patent and Trademark Office*